US011434877B2

(12) United States Patent
Hemmelmann et al.

(10) Patent No.: US 11,434,877 B2
(45) Date of Patent: Sep. 6, 2022

(54) DIRECT-DRIVE WIND TURBINE INCLUDING MULTIPLE BEARING SETS AND INNER AND OUTER FRAME STRUCTURE MEMBERS AXIALLY EXTENDING THROUGH A GENERATOR CORE FOR SUPPORTING THE GENERATOR AND ROTOR HUB

(71) Applicant: General Electric Renovables España, S.L., Barcelona (ES)

(72) Inventors: Jan Erich Hemmelmann, Frankfurt Am Main (DE); Julian Fernandez Buezas, Barcelona (ES)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 16/940,700

(22) Filed: Jul. 28, 2020

(65) Prior Publication Data
US 2021/0033073 A1 Feb. 4, 2021

(30) Foreign Application Priority Data
Jul. 29, 2019 (EP) .................................... 19382647

(51) Int. Cl.
*F03D 15/20* (2016.01)
*F03D 9/25* (2016.01)
*F03D 80/80* (2016.01)

(52) U.S. Cl.
CPC ............... *F03D 15/20* (2016.05); *F03D 9/25* (2016.05); *F03D 80/88* (2016.05); *F05B 2260/40* (2013.01); *F05B 2260/902* (2013.01)

(58) Field of Classification Search
CPC . F03D 15/20; F03D 80/88; F03D 9/25; F05B 2260/40; F05B 2260/902; Y02E 10/72
See application file for complete search history.

(56) References Cited

U.S. PATENT DOCUMENTS

| 2006/0152016 A1* | 7/2006 | Bywaters | ............... | H02K 7/102 290/55 |
| 2013/0099503 A1* | 4/2013 | Bagepalli | ............... | H02K 1/146 290/55 |
| 2014/0147279 A1* | 5/2014 | Lind | ..................... | F03D 7/0248 416/169 R |

FOREIGN PATENT DOCUMENTS

CN 201 165 940 Y 12/2008
DE 10 2004 031329 A1 1/2006
(Continued)

OTHER PUBLICATIONS

EPO Search Report, dated Jan. 22, 2020.

*Primary Examiner* — Tulsidas C Patel
*Assistant Examiner* — S. Mikailoff
(74) *Attorney, Agent, or Firm* — Dority & Manning, P.A.

(57) ABSTRACT

Direct-drive wind turbines (160) are disclosed. The wind turbine comprise a generator (3) mounted on a frame (1), the generator (3) comprising a generator stator (32) and a generator rotor (31) configured to rotate about a rotation axis (RA), the frame (1) has a protruding portion (11) extending beyond the generator (3), the protruding portion (11) comprising a first structure and a second structure; wherein the first and second structures are configured to rotate relative to each other and about the rotation axis (RA); wherein the first structure is attached to the generator stator (32) and the second structure is attached to the generator rotor (31); a brake system (2) attached to the first and second structures, the brake system (2) being spaced away from the generator (3) along the rotation axis (RA). Also disclosed are methods (200) for braking a direct-drive wind turbine (160).

14 Claims, 5 Drawing Sheets

(56) References Cited

FOREIGN PATENT DOCUMENTS

| | | |
|---|---|---|
| DE | 10 2018 100864 A1 | 7/2019 |
| EP | 1 925 820 A1 | 5/2008 |
| WO | WO 2014/032826 A1 | 3/2014 |

* cited by examiner

DIRECT-DRIVE WIND TURBINE INCLUDING MULTIPLE BEARING SETS AND INNER AND OUTER FRAME STRUCTURE MEMBERS AXIALLY EXTENDING THROUGH A GENERATOR CORE FOR SUPPORTING THE GENERATOR AND ROTOR HUB

The present disclosure relates to direct-drive wind turbines and methods for braking such direct-drive wind turbines.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly ("directly driven" or "gearless") or through the use of a gearbox. This way, the generator produces electricity which can be supplied to the electrical grid.

In conventional wind turbines, the gearbox increases the speed of the wind-driven rotor. This reduces the required size of the generator. In the directly driven generators typically used in offshore direct-drive wind turbines, the rotor shaft is generally directly connected to the rotor hub. Direct-drive wind turbines thus comprise generators operating at the same rotational speed as the rotor with wind turbine blades and therefore having a much larger diameter than generators used in wind turbines having a gearbox.

One challenging topic of the direct-drive wind turbines is related to the rotor brake system. As there is no gearbox, a relatively large braking moment is required to reduce the speed of the rotor, so the features of the brake system have to be chosen to withstand the braking moment. This issue is becoming more and more important because there is a trend to make wind turbines increasingly larger to capture more wind and convert the energy of the wind into electricity. The larger wind turbines may require a bigger braking moment and the bigger braking moment may involve increasing the size of the rotor brake systems.

Due to space limitations, the usual location of the rotor brake system in a direct-drive wind turbine is in the generator to act between the generator stator and the generator rotor. However, the current arrangement of the brake system in the generator limits the size that can be achieved by the brake system.

Furthermore, and regarding the usual arrangement of the brake system in the generator, if brake callipers are of a hydraulic type, there is a significant risk of leaking oil reaching the air gap of the generator.

Additionally, evacuation route inside the generator is compromised by the brake callipers interfering with the minimum clearance required according to safety standard.

Moreover, accessibility to component exchange, particularly in generator, is significantly reduced by the presence of the brake system in the generator.

The present disclosure provides examples of direct-drive wind turbines and methods that at least partially resolve some of the aforementioned disadvantages.

SUMMARY

In one aspect, a direct-drive wind turbine is provided. The direct-drive wind turbine comprises a generator mounted on a frame, the generator comprising a generator stator and a generator rotor configured to rotate about a rotation axis, the frame has a protruding portion extending beyond the generator, the protruding portion comprising a first structure and a second structure. The first and second structure are configured to rotate relative to each other and about the rotation axis. The first structure is attached to the generator stator and the second structure is attached to the generator rotor. The direct-drive wind turbine further comprises a brake system attached to the first and second structures, the brake system being spaced away from the generator along the rotation axis.

In this aspect, typical space limitations or constraints of the generator may be avoided. Integration of the brake system inside a direct-drive wind turbine may be facilitated. The size of the brake system, e.g. the calipers, may also be increased and so the obtained braking moment. Thus, the direct-drive wind turbine may be designed with a relatively larger size to capture more wind and convert the energy of the wind into electricity.

Furthermore, an evacuation route inside the generator may not be compromised in the direct-drive wind turbine of this aspect by the brake system because a minimum required clearance may be obtained. Therefore, safety conditions may be enhanced.

Moreover, as the brake system may be spaced apart from the generator, the risk of leaking oil reaching the air gap of the generator may be avoided.

Additionally, an enhanced accessibility to component exchange of the direct-drive wind turbine, particularly the generator, may be obtained. This may mean easier maintenance or repair tasks and reducing the involved time.

The ergonomics for the operators inside the nacelle is also enhanced thanks to the features of this first aspect.

In another aspect, a method for braking a direct-drive wind turbine is provided. The wind turbine comprises a rotor hub, a generator mounted on a frame, and a brake system, the frame having a protruding portion extending beyond the generator, the protruding portion comprising first and second structures configured to rotate relative to each other and about a rotation axis, wherein the first structure is attached to a generator stator and the second structure is attached to a generator rotor, the brake system being attached to the first and second structures and the brake system being spaced away from the generator along the rotation axis. The method comprises determining at a controller of the wind turbine, a target rotational speed of the rotor hub, and adjusting a rotational speed of the rotor hub to the target rotational speed by controlling a friction exerted by the brake system.

In yet another aspect, a direct-drive wind turbine is provided. The direct-drive wind turbine comprises a rotor hub having a hollow body, a generator mounted on a frame about a rotation axis, the generator having a generator rotor and a generator stator. The frame has a protruding portion extending beyond the generator into the hollow body of the rotor hub. The protruding portion comprises a stationary inner structure attached to the generator stator; an outer structure which is configured to rotate about the rotation axis and is attached to the generator rotor. The direct-drive wind turbine further comprises: a brake system comprising a disc attached to one of the outer structure and the inner structure and a calliper attached to the other of the outer structure and the inner structure.

Advantages derived from this aspect may be similar to those mentioned regarding the direct-drive wind turbine of the first aspect.

BRIEF DESCRIPTION OF THE DRAWINGS

Non-limiting examples of the present disclosure will be described in the following, with reference to the appended drawings, in which.

DETAILED DESCRIPTION OF EXAMPLES

In these figures the same reference signs have been used to designate matching elements.

Figure 1:
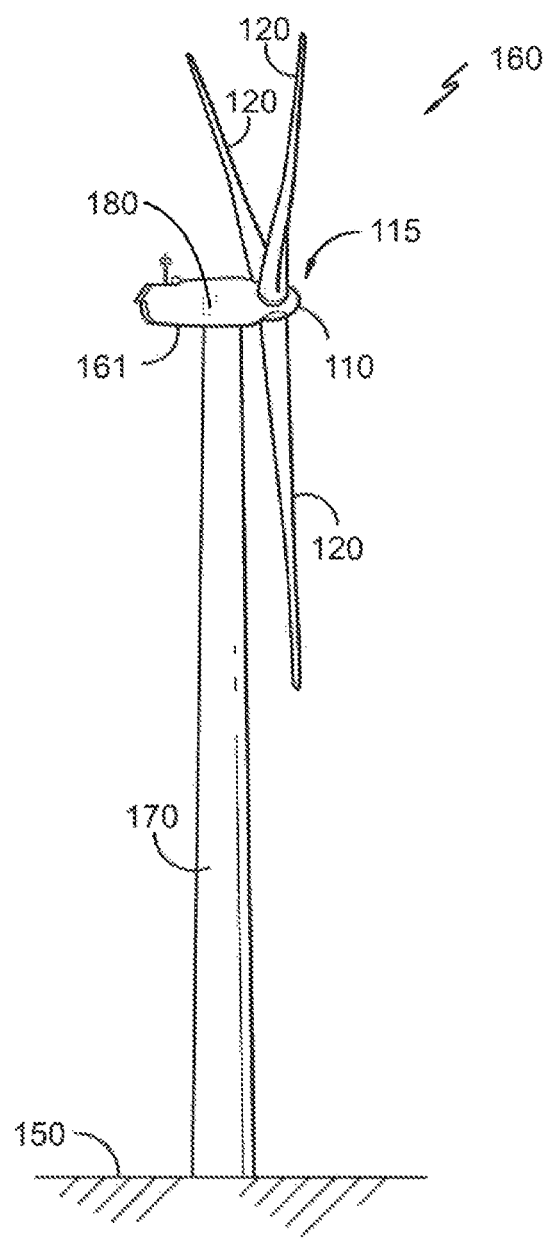
FIG. 1 illustrates a perspective view of a wind turbine according to one example.

FIG. 1 illustrates a perspective view of one example of a wind turbine 160. As shown, the wind turbine 160 includes a tower 170 extending from a support surface 150, a nacelle 161 mounted on the tower 170, and a rotor 115 coupled to the nacelle 161. The rotor 115 includes a rotatable rotor hub 110 and at least one rotor blade 120 coupled to and extending outwardly from the rotor hub 110. For example, in the illustrated example, the rotor 115 includes three rotor blades 120. However, in an alternative embodiment, the rotor 115 may include more or less than three rotor blades 120. Each rotor blade 120 may be spaced from the rotor hub 110 to facilitate rotating the rotor 115 to enable kinetic energy to be transferred from the wind into usable mechanical energy, and subsequently, electrical energy. For instance, the rotor hub 110 may be rotatably coupled to an electric generator 3 (FIG. 2) positioned within the nacelle 161 or forming part of the nacelle to permit electrical energy to be produced.

The wind turbine 160 may also include a wind turbine controller 180 centrally located within the nacelle 161. However, in other examples, the wind turbine controller 180 may be located within any other component of the wind turbine 160 or at a location outside the wind turbine. Further, the controller 180 may be communicatively coupled to any number of components of the wind turbine 160 in order to control the operation of such components.

The wind turbine 160 of FIG. 1 may be placed in an offshore or onshore location.

The wind turbine controller 180 may include one or more processor(s) and associated memory device(s) configured to perform a variety of computer-implemented functions (e.g., performing the methods, steps, calculations and the like and storing relevant data as disclosed herein). The wind turbine controller may perform various different functions, such as receiving, transmitting and/or executing wind turbine control signals and controlling the overall operation of the wind turbine. The wind turbine controller may be programmed to control the overall operation based on information received from sensors indicating e.g. loads, wind speed, wind direction, turbulence failure of a component and other.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor is also configured to compute advanced control algorithms and communicate to a variety of Ethernet or serial-based protocols (Modbus, OPC, CAN, etc.). Additionally, the memory device(s) may comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may be configured to store suitable computer-readable instructions that, when implemented by the processor(s), configure the controller to perform the various functions as described herein.

Figure 2:
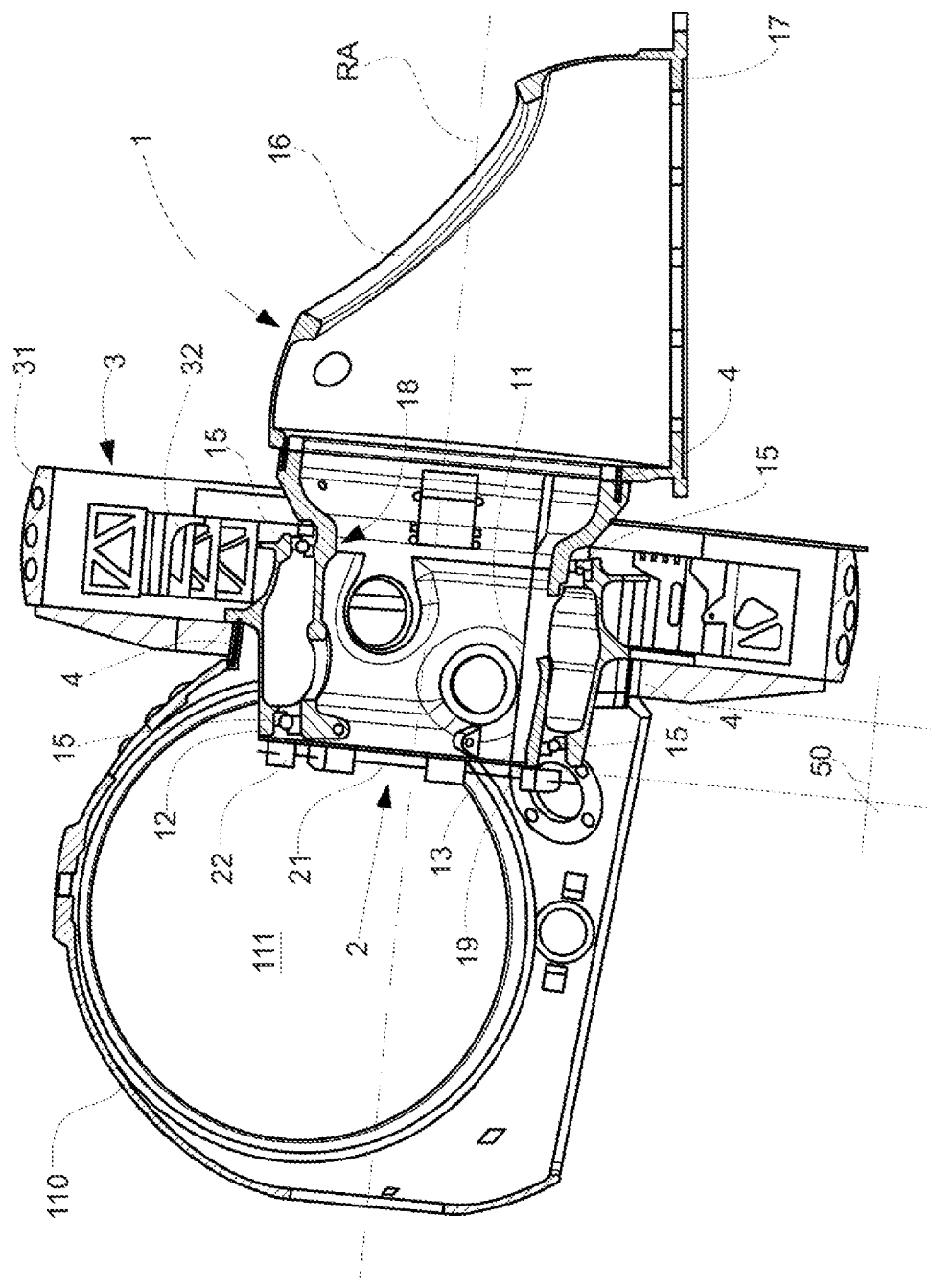
FIG. 2 illustrates a simplified, internal cross-sectional view of a nacelle and a rotor hub of a wind turbine according to one example.

FIG. 2 illustrates a simplified, internal cross-sectional view of the nacelle 161 and the rotor hub 110 of a wind turbine according to one example. Some elements of the wind turbine 160 have not been illustrated for the sake of clarity. As shown, the generator 3 may be coupled to the rotor hub 110 of the wind turbine 160 for generating electrical power from the rotational energy generated. Thus, rotation of the rotor hub 110 drives the generator 3.

It should be appreciated that frame 1 and generator 3 may generally be supported within the nacelle 161 by a support frame or bedplate 17 positioned atop the wind turbine tower 170. The nacelle 161 is rotatably coupled to the tower 170. The bedplate 17 may be rotatably coupled to a wind turbine tower According to one aspect, a direct-drive wind turbine 160 as per FIGS. 1 and 2 is disclosed. The wind turbine 160 comprises a generator 3 mounted on a frame 1. The generator 3 comprises a generator stator 32 and a generator rotor 31 configured to rotate about a rotation axis RA. The frame 1 has a protruding portion 11 extending beyond the generator 3. The protruding portion 11 comprises a first structure and a second structure. The first and second structures are configured to rotate relative to each other and about the rotation axis RA. The first structure is attached to the generator stator 32 and the second structure is attached to the generator rotor 31. The wind turbine 160 further comprises a brake system 2 attached to the first and second structures. The brake system is spaced away from the generator 3 along the rotation axis RA.

Terms first structure and second structure as used herein may be interchangeable.

In the example illustrated in FIG. 2, the protruding portion 11 extends towards the rotor hub 110 of the wind turbine 160 along the rotation axis RA. Thus, the protruding portion 11 may extend in an upwind direction along the rotation axis RA.

In another example, the protruding portion may extend away from the rotor hub 110 of the wind turbine 160 along the rotation axis RA. The protruding portion 11 may extend towards the bed plate 17 or tower 170, i.e. the protruding portion 11 may be positioned in an opposite direction to the rotor hub 110 along the rotation axis RA. Therefore, the protruding portion 11 may extend in a downwind direction along the rotation axis RA.

A distance 50 may be defined between the generator 3 and the brake system 2, i.e. the brake system 2 can be placed spaced apart from the generator 3 or even a housing or cover of the generator 3. The distance 50 can be clearly seen in FIG. 2, where the brake system 2 is positioned at a distal end 19 of the protruding portion 11, the distal end 19 of the protruding portion 11 being positioned away from the generator 3 along the rotation axis RA. Distance 50 may also be defined when the protruding portion 11 extends towards the bed plate 17 or the tower 170.

Referring to FIG. 2, the protruding portion 11 may be a front portion of the frame 1. In this case, the frame 1 may have a rear portion 16 facing towards the bedplate 17 of the wind turbine 160.

In one example, the first structure may be an inner structure 13 and the second structure may be an outer structure 12. This example can be seen in FIG. 2. In another example, the first structure may be an outer structure and the second structure may be an inner structure. In both examples the inner and the outer structure may rotate relative to each other and about the rotation axis RA.

According to one example of the direct-drive wind turbine 160, the outer structure 12 may be operatively connected to the rotor hub 110 through the generator rotor 31. The latter may be achieved, for instance, through a series of bolts 4 as shown in FIG. 2. The bolts 4 are joining together the rotor hub 110, the outer structure 12 and the generator rotor 31 in such a way that at least a part of the generator rotor 31 is sandwiched by the rotor hub 110 and the outer structure 12. This exemplary joint may allow to transmit the rotating movement of the rotor hub 110 to the outer structure 12 through the generator rotor 31. Conversely, if the outer structure 12, for example, is braked then the generator rotor 31 and the rotor hub 110 may be braked as well.

In another example, the joint may be achieved through any fasteners available on the market or even through welding.

As shown in FIG. 2, the first structure may have a tapered region 18 towards the rotor hub 110. The second structure may be rotatably mounted on the tapered region 18, i.e. the second structure can rotate about the rotation axis RA and the first structure. The tapered region 18 may protrude from the generator 3, at least partially, towards the rotor hub 110.

As illustrated, the direct-drive wind turbine 160 may further comprise a pair of bearings 15 between the second structure, e.g. outer structure 12, and the first structure, e.g. inner structure 13. The pair of bearings 15 may be spaced apart each other along the rotational axis RA. Alternatively, a single bearing may rotatably connect the first structure and the second structure.

Following with the example of FIG. 2, at least a part of the protruding portion 11 may be placed in a room 111 defined inside the rotor hub 110. The room 111 may provide enough space to choose the brake system 2 with a significantly large size. The room 111 may be defined as the hollow body of the rotor hub 110.

In FIG. 2, the generator rotor 31 surrounds the generator stator 32. However, in other examples, the generator stator may surround the generator rotor. In these other examples, the generator rotor may be associated with the rotor hub and the stator generator may be associated with the inner structure like any of the examples herein disclosed with respect to a generator rotor surrounding the generator stator.

Figure 3:
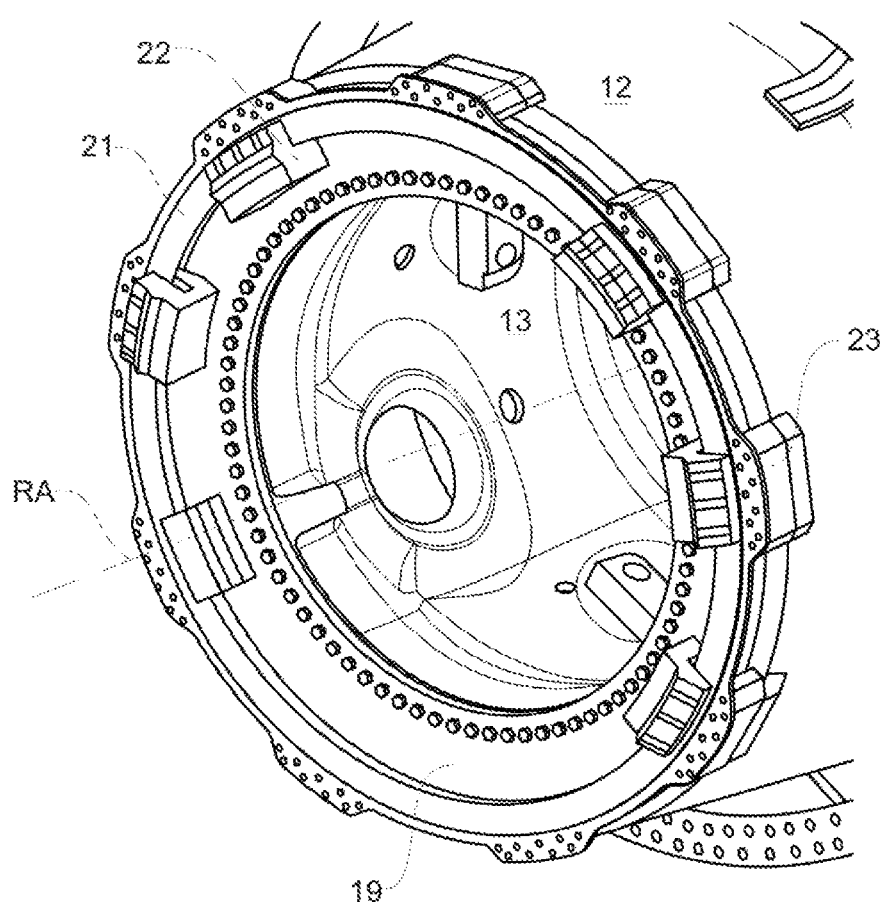
FIG. 3 illustrates a perspective and partial view of a protruding portion of a frame of the wind turbine of FIG. 1 according to one example.

FIG. 3 illustrates a perspective and partial view of a protruding portion of a frame of the wind turbine of FIG. 1 according to one example. As shown in FIGS. 2 and 3, the outer structure 12 and the inner structure 13 are concentrically positioned about the rotation axis RA, the inner structure 13 is positioned between the outer structure 12 and the rotation axis RA. Although the example illustrated in FIG. 2 shows the outer structure 12 and the inner structure 13 having a drum-like shape, alternatively the outer structure 12 as second structure or the inner structure 13 as first structure may be formed by a plurality of connecting arms disposed around the rotation axis RA.

Figure 4:
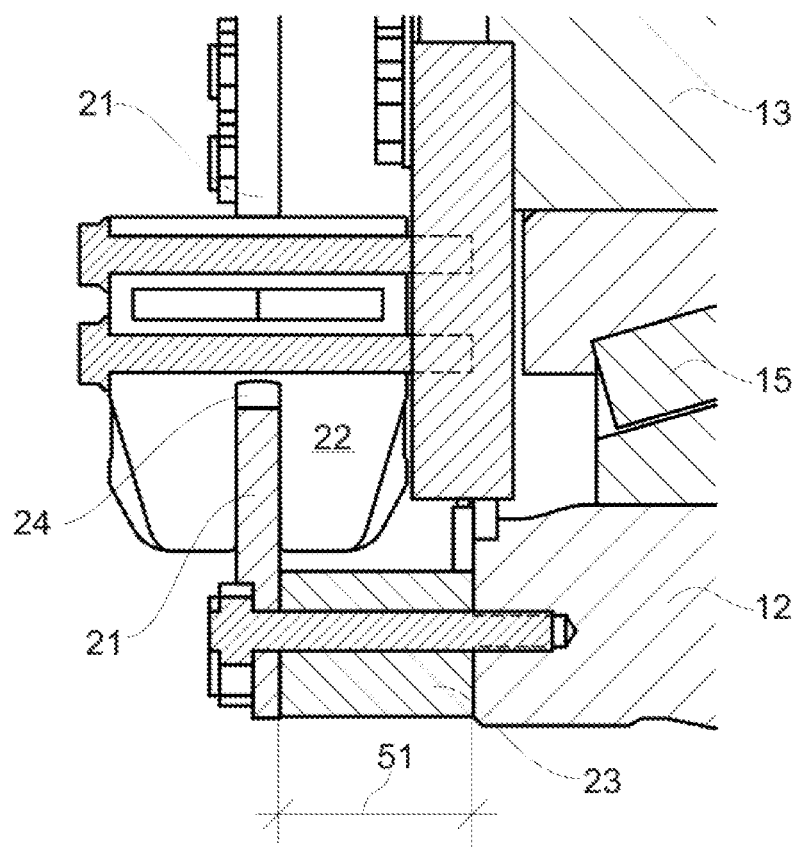
FIG. 4 shows a partial cross-section view of a brake system and a protruding portion of the frame of the wind turbine of FIG. 1 according to one example.

FIG. 4 shows a partial cross-section view of a brake system and a protruding portion of the frame of the wind turbine of FIG. 1 according to one example.

In one example, the brake system 2 may comprise a disc 21 and a calliper 22, the disc 21 may be attached to one of the first and second structures and the calliper 22 may be attached to the other one. In a specific example, the disc 21 may be attached to the second structure and the calliper 22 may be attached to the first structure. In both cases, the disc 21 may be generally "ring-shaped" and may be manufactured from a metallic material or the like.

Referring now to the examples of FIGS. 3 and 4, it can be seen that the disc 21 is attached to the outer structure 12 and the caliper 22 to the inner structure 13. In another example, the disc 21 may be attached to the inner structure 13 and the calliper 22 to the outer structure 12.

In some other examples, the brake system 2 may have a plurality of callipers circularly provided around the rotational axis RA. The callipers 22 may be regularly placed relative to the disc 21. Calliper 22 may have a number of pads configured to cause friction between the calliper 22 and the disc 21 to at least reduce, maintain or increase the rotational speed of the outer structure 12. The calliper may therefore clamp the disc 21. Thus, the outer structure 12 may rotate substantially faster, slower or the rotational speed may be unchanged.

Furthermore, the brake system 2 may be used as a stationary parking brake to substantially prevent rotational movement of the outer structure 12 with respect to the inner structure 13. In this case, the rotational speed of the outer structure 12 may be kept unchanged and substantially null.

Moreover, the brake system 2 may be used to control rotational movement of the outer structure 12 with respect to the inner structure 13. For instance, a substantially constant rotational speed of the outer structure 12 may be produced.

As shown in FIG. 3, the calliper 22 may be disposed between the rotation axis RA and the disc 21. This way, the diameter of the disc 21 may be increased outwardly from the rotation axis RA. The size of the calliper 22 may be chosen to match the size of the cross-section of a larger disc 21.

In an example of the direct-drive wind turbine 160, the calliper 22 may be operatively connected to the generator stator 32 through the first structure of the frame 1 and the disc 21 may be operatively connected to the generator rotor 31 through the second structure. This way, the brake system 2 may act on the generator rotor 31. When the brake system 2 is operated, it may make the generator rotor 31 slow down.

In another example, the disc 21 may be disposed between the rotation axis RA and the calliper 22. In this example, the disc 21 may be attached to the inner structure 13 and the calliper 22 to the outer structure 12.

Following with the examples of FIGS. 3 and 4, the calliper 22 may have a U-shaped cross-section to receive the cross section of the disc 21. A cavity 24 defined by the U-shaped cross-section of the calliper 22 may be facing outwardly from the rotation axis RA. The cavity 24 may receive at least a portion of the cross section of the disc 21.

Referring now to FIG. 4 the disc 21 may be attached to the second structure through spacers 23. The distance 50 may be increased by a spacing 51 between the disc 21 and the second structure, e.g. outer structure 12. The spacers 23 may increase further the distance 50 between the brake system 2 and the generator 3. The spacers 23 may be chosen to adjust the clearance between the protruding portion 11 and the brake system 2 along the rotation axis RA. An increased clearance may allow installing a larger brake system 2, particularly a larger calliper 22.

In some examples, the brake system 2 may be driven by a hydraulic system to act on pads of the calliper 22 to exert pressure on the disc 21. The hydraulic system may have a pump, a pressure reservoir or the like in fluid communication with pistons to apply a force to the pads. In order to control the brake system 2, the controller 180 may send a command to the pump or pressure reservoir to increase or decrease or maintain pressure of the fluid of the hydraulic system and thus to transfer pressure from the fluid to the pistons and so to the pads of the calliper 22.

In alternative examples, the brake system 2 may be based on electromechanical technology. Instead of the hydraulic system, an electric actuator linked to the calliper 22 may receive the corresponding command from the controller 180 to control the friction exerted to the disc 21 and so the rotational speed of the outer structure 12.

Figure 5:
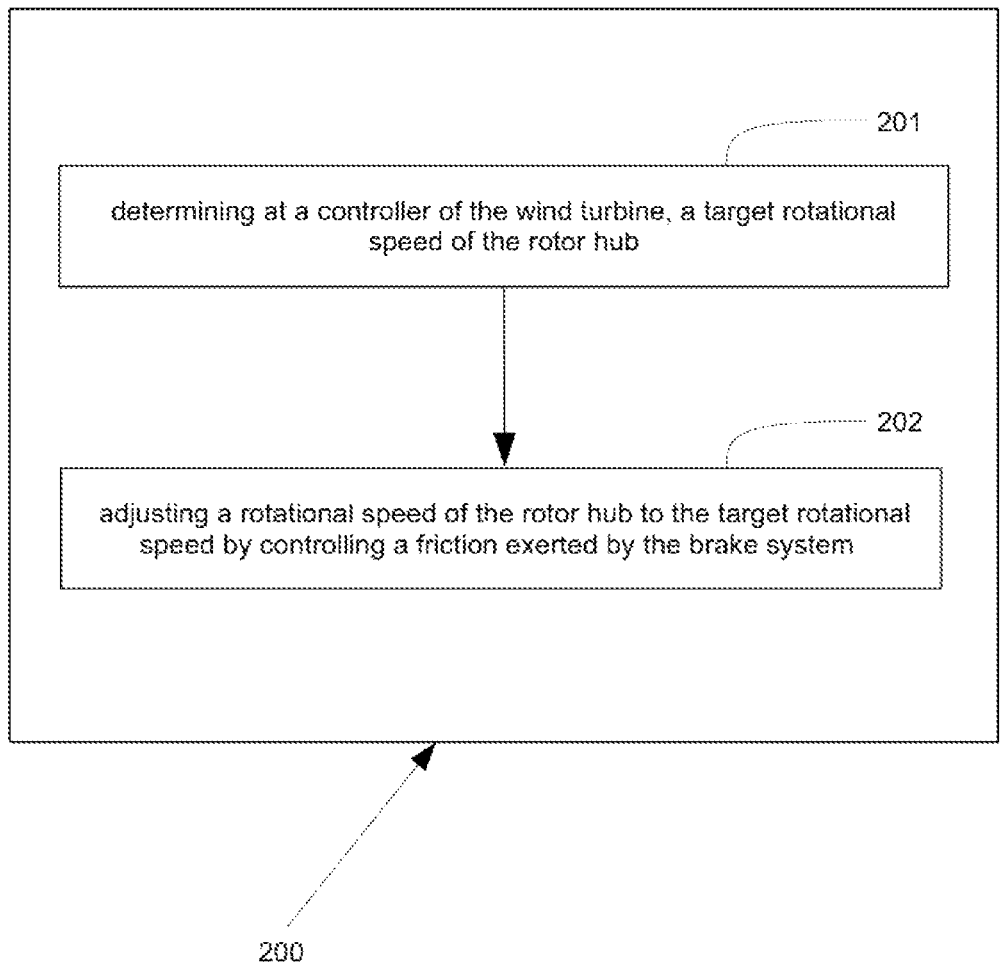
FIG. 5 shows a flowchart of a method for braking a direct-drive wind turbine according to one example.

FIG. 5 shows a flowchart of a method 200 for braking a direct-drive wind turbine according to one example. The wind turbine 160 may be that one illustrated in FIG. 1 or 2 and thus it includes the wind turbine controller 180.

According to an aspect, a method 200 for braking a direct-drive wind turbine 160 is provided. The wind turbine 160 comprises: a rotor hub 110 and a generator 3 mounted on a frame 1. The wind turbine 160 further comprises a brake system 2. The frame has a protruding portion 11 extending beyond the generator 3. The protruding portion 11 comprises first and second structures configured to rotate relative to each other and about a rotation axis RA. The first structure is attached to a generator stator 32 and the second structure is attached to a generator rotor 31, the brake system 2 being attached to the first and second structures and the brake system 2 being spaced away from the generator 3 along the rotation axis RA. The method 200 comprises determining 201, at the controller 180 of the wind turbine 160, a target rotational speed of the rotor hub 110. The method 200 further comprises adjusting 202 a rotational speed of the rotor hub 110 to the target rotational speed by controlling the friction exerted by a braking system 2.

In some examples of the method 200, it may further comprise applying friction with a calliper to the disc 21 attached to the second structure until a rotation of the rotor hub 110 is stopped. The rotation may be stopped with respect to the rotation axis RA.

Braking moment may be obtained by the method 200 stepwise or continuously.

In an exemplary operation, a rotational movement of the rotor hub 110 may be transmitted to the generator rotor 31 because they may be fastened through bolts 4. An amount of rotational movement, e.g. a turn, of the rotor hub 110 around the rotational axis RA may mean the same amount of rotational movement of the generator rotor 31 because it is a direct-drive wind turbine 100. The outer structure 12 may also rotate the same amount of rotational movement because it is attached to the generator rotor 31, for instance through bolts 4. Thus, the outer structure 12 may rotate relative to the inner structure 13. In the example of FIG. 2 or 3 the disc 21 is attached to the outer structure 12 and the callipers 22 are attached to the inner structure 13. Therefore, if the rotor hub 110 is turning around the rotational axis RA, disc 21 does it as well.

The controller 180 determines a target rotational speed of the rotor hub 110. The rotational speed of the rotor hub 110 may be compared with the target rotational speed, for instance by the controller 180. Depending on this comparison the friction to the disc 21, which is controlled by the controller 180, may be reduced, increased or maintained. By way of example, if a difference between the rotational speed of the rotor hub 110 and the target rotational speed is out of a predetermined range, the controller 180 may trigger the brake system 2 to substantially increase or decrease the friction to the disc 21 to adjust the rotational speed. If a difference between the rotational speed of the rotor hub 110 and the target rotational speed is within a predetermined range, the controller 180 may trigger the brake system 2 to substantially maintain the friction to the disc 21.

The calliper 22 may exert pressure on the disc 21 to generate friction. Therefore, the rotational speed of generator rotor 31 and outer structure 12 may be increased, reduced, maintained or even they may be stopped depending on the friction generated between disc 21 and callipers 22. Depending on the amount of exerted pressure on the disc 21 the rotational speed of the rotor hub 110, may be adjusted, e.g. increased, maintained, reduced or even stopped. An increased amount of friction may mean a reduction in rotational speed, a decreased amount of friction may mean an increase in rotational speed and an unchanged amount of friction may mean an unchanged rotational speed.

The above exemplary braking operation has been depicted regarding two scenarios: the first one in which the rotor 115 is already rotating about the rotational axis RA and the brake system 2 is actuated then. In the second one, the brake system 2 may be actuated when the rotor 115 is already stopped or at least when no rotational movement is substantially defined. The latter may occur for instance when the wind turbine 2 is broken-down or maintenance tasks must be performed. This way, a stopped status of the rotor 115 may be assured.

According to a yet another aspect, a direct-drive wind turbine 160 is provided. The wind turbine 160 of this aspect comprises a rotor hub 110 having a hollow body and a generator 3 mounted on a frame 1 about a rotation axis RA. The generator 3 has a generator rotor 31 and a generator stator 32. The frame 1 has a protruding portion 11 extending beyond the generator 3 into the hollow body of the rotor hub 110. The protruding portion 11 comprises a stationary inner structure 13 attached to the generator stator 32. The protruding portion 11 further comprises an outer structure 12 which is configured to rotate about the rotation axis RA and is attached to the generator rotor 31. The direct-drive wind turbine 160 further comprises a brake system 2 comprising a disc 21 attached to one of the outer structure 12 and the inner structure 13 and a calliper 22 attached to the other of the outer structure 12 and the inner structure 13.

In one example, the disc 21 may be attached to the outer structure 12 and the calliper 22 may be attached to the inner structure 13. In another example, the disc 21 may be attached to the inner structure 13 and the calliper 22 may be attached to the outer structure 12.

According to one example of this aspect, the outer structure 12 and the inner structure 13 may be concentrically positioned about the rotation axis RA, the inner structure 13 may be positioned between the outer structure 12 and the rotation axis RA.

In another example, the inner structure may have a tapered region 18 towards the hollow body of the rotor hub 110, the outer structure 12 may be rotatably mounted on the tapered region.

In a further example, the brake system 2 may be spaced away from the generator 3 along the rotation axis RA.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A direct-drive wind turbine comprising:
   a generator mounted on a frame, the generator comprising a generator stator concentrically surrounded by a generator rotor, the generator rotor configured to rotate about a rotation axis;
   the frame comprising a rear portion for mounting the frame to a tower of the wind turbine, the frame further comprising an outer structure member concentrically surrounding an inner structure member, the outer and inner structure members extending axially through an axial core of the generator along the rotation axis such that the generator concentrically surrounds both the outer and inner structure members and respective distal ends of the outer and inner structure members are offset, along the rotation axis and in a direction away from the rear portion of the frame, from an axial center of the generator;
   bearings located between the outer and inner structure members such that the outer and inner structure members rotate relative to each other about the rotation axis, the bearings comprising a first bearing set located at the distal ends of the inner and outer structure members and a second bearing set axially offset from the first bearing set and concentrically surrounded by the generator, the outer structure member connected to the generator rotor at locations axially between the first and second bearing sets; and
   a brake system attached to the outer and inner structure members at the distal ends thereof so as to be offset, along the rotation axis, from the axial center of the generator in the direction away from the rear portion of the frame.

2. The direct-drive wind turbine according to claim 1, wherein the distal ends of the inner and outer structure members extend into a rotor hub of the wind turbine along the rotation axis.

3. The direct-drive wind turbine according to claim 1, wherein the generator stator is concentric within the generator rotor, and the inner structure member is attached to the generator stator.

4. The direct-drive wind turbine according to claim 3, wherein the inner and outer structure members are concentrically positioned about the rotation axis, the inner structure member being positioned between the outer structure member and the rotation axis.

5. The direct-drive wind turbine according to claim 1, wherein the brake system comprises a disc and a calliper, the disc being attached to one of the inner and outer structure members and the calliper being attached to the other of the inner and outer structure members.

6. The direct-drive wind turbine according to claim 5, wherein the disc is attached to the outer structure member and the calliper is attached to the inner structure member.

7. The direct-drive wind turbine according to claim 6, wherein the calliper is disposed between the rotation axis and the disc.

8. The direct-drive wind turbine according to claim 7, wherein the calliper has a U-shaped cross-section to receive a cross section of the disc, and a cavity defined by the U-shaped cross-section of the calliper is facing outwardly from the rotation axis.

9. The direct-drive wind turbine according to claim 6, wherein the disc is attached to the outer structure member through spacers.

10. The direct-drive wind turbine according to claim 5, wherein the calliper is operatively connected to the generator stator through the inner structure member and the disc is operatively connected to the generator rotor through the outer structure member.

11. The direct-drive wind turbine according to claim 1, wherein the inner structure member has a tapered region that tapers towards the distal end of the inner structure member, the outer structure member being rotatably mounted on the tapered region.

12. A method for braking the direct-drive wind turbine of claim 1, the method comprising:
   determining at a controller of the wind turbine, a target rotational speed of a rotor hub of the wind turbine; and
   adjusting a rotational speed of the rotor hub to the target rotational speed by controlling a friction exerted by the brake system.

13. The method according to claim 12, further comprising applying the friction with a calliper and a disc of the brake system until a rotation of the rotor hub is stopped, the disc being attached to the outer structure member.

14. The direct-drive wind turbine according to claim 1, further comprising a rotor hub having a hollow body, wherein the brake system is located within the hollow body.

* * * * *